United States Patent [19]
Kitazawa et al.

[11] Patent Number: 6,067,421
[45] Date of Patent: May 23, 2000

[54] CAMERA FOCUS ADJUSTING DEVICE FOR MOVING AN IMAGING UNIT

[75] Inventors: Tomofumi Kitazawa, Yokohama; Saburoh Sasaki; Takashi Shimamura, both of Tokyo, all of Japan

[73] Assignee: Ricoh Company, Ltd., Tokyo, Japan

[21] Appl. No.: 09/231,777

[22] Filed: Jan. 15, 1999

[30] Foreign Application Priority Data

Jan. 16, 1998 [JP] Japan .................................. 10-007038

[51] Int. Cl.[7] .................................................. G03B 13/34
[52] U.S. Cl. .......................................................... 396/133
[58] Field of Search ............................. 396/133; 359/824

[56] References Cited

U.S. PATENT DOCUMENTS

| | | | |
|---|---|---|---|
| 4,291,958 | 9/1981 | Frank et al. ............................. | 396/133 |
| 4,601,539 | 7/1986 | Watanabe et al. ....................... | 359/824 |
| 4,868,597 | 9/1989 | Tanaka et al. ........................... | 396/133 |

FOREIGN PATENT DOCUMENTS

| | | |
|---|---|---|
| 63-47694 | 2/1988 | Japan . |
| 8-94906 | 4/1996 | Japan . |

*Primary Examiner*—W. B. Perkey
*Attorney, Agent, or Firm*—Oblon, Spivak, McClelland, Maier & Neustadt, P.C.

[57] ABSTRACT

A focus adjusting device which includes an imaging unit, such as a lens group, a film, a charge coupled device, a CMOS sensor, etc., and at least one electrostriction unit deforming based on an applied voltage and configured to move the imaging unit from the deforming. Further, positioned between the imaging unit and the at least one electrostriction unit is a mechanism for increasing or accumulating the deforming of the at least one electrostriction unit. The electrostriction unit can take the form of a laminate piezoelectric device. In one specific embodiment, the mechanism provided between the imaging unit and the at least one electrostriction unit is a lever which increases the deforming of the at least one electrostriction unit. In another embodiment, at least two electrostriction units are utilized and the mechanism provided between the at least two electrostriction units and the imaging unit is a coupling between the at least two electrostriction units which accumulates the deforming of each of the at least two electrostriction units. According to a further embodiment, the mechanism provided between the imaging unit and the at least one electrostriction unit is an elastic member with curved portions which increase the deforming of the at least one electrostriction unit in a direction perpendicular to a direction of the deforming of the at least one electrostriction unit.

23 Claims, 12 Drawing Sheets

CAMERA FOCUS ADJUSTING DEVICE FOR MOVING AN IMAGING UNIT

BACKGROUND OF THE INVENTION

1. Field of the Invention

This invention relates to a focus adjusting device for a camera, and more particularly to a focus adjusting device in which an electrostriction device, such as a laminate piezoelectric device, is used and a deformation of the electrostriction device is increased or accumulated for moving an imaging unit, such as a lens system, film, or imaging device.

2. Discussion of the Background

A focus adjusting operation for an auto focus (AF) for a camera has been performed as follows. In a camera using a photographic film, a focus adjusting is typically performed by either (1) moving a part or whole of a lens group, which constitutes an optical system, along the optical axis of the lens group, or (2) by moving a position of a film in the direction of the optical axis of the lens group. In a digital camera, a focus adjusting is also typically performed by either (1) moving a part or whole of a lens group, which constitutes an optical system, along the optical axis of the lens group, or (2) by moving an imaging device, for example a charge coupled device (CCD) or CMOS sensor, in the direction of the optical axis of the lens group.

In both of the above-described film camera and digital camera, a motor, such as a DC motor, a stepping motor, an ultrasonic motor, etc., is generally used as a driving source for the focus adjusting.

However, the following problems arise by using a motor as a driving source. First, the space required for the motor, and a gear reduction block that is necessary for the motor, prevent providing a compact camera. Second, the motor typically has a rising-time characteristic and a multiple-pulse driving, and as a result a relatively long time interval is needed to move a lens, a film, or an imaging device, to a predetermined distance. Third, a driver circuit only for driving the motor is necessary, and thereby costs are increased.

In order to solve the above-described problems, for example, a method of using a piezoelectric device for focusing is described in "LENS DEVICE" of Japanese Laid-Open Patent Publication No. 8-94906/1996.

In the above lens device, focusing is performed by using a piezoelectric actuator to move a lens group along an optical axis of the lens group. Specifically, a pin of a holding frame holding a lens group is made to pierce through a cam groove of a focus cam ring and engage with a cam groove of a zoom cam ring. The focus cam ring is driven by a driving section which is disposed in an optical axis direction and which connects to a piezoelectric actuator, and friction is produced between the driving section and the focus cam ring by deformation of a piezoelectric member of the piezoelectric actuator. When a voltage with driving pulses is applied to the piezoelectric actuator, the focus cam ring is moved in the optical axis direction, and thereby the focusing is performed.

Figure 21A:
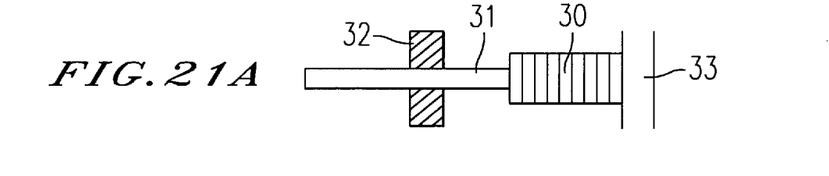
FIGS. 21(A)–21(C) are illustrations for explaining a driving device in the noted background lens device.
Figure 21B:
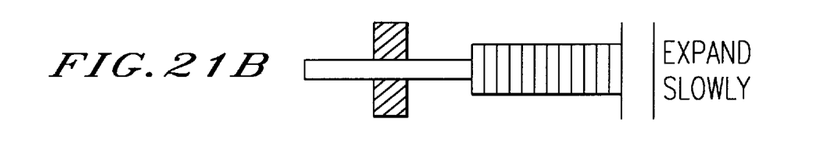
Figure 21C:
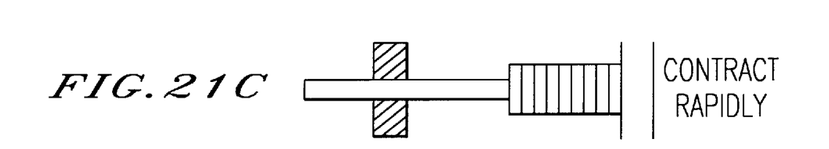
Figure 22A:
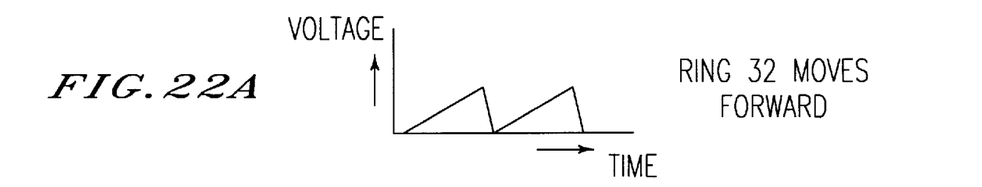
FIGS. 22(A) and 22(B) are waveform charts showing waveforms of driving pulses in the driving device in the noted background lens device.
Figure 22B:
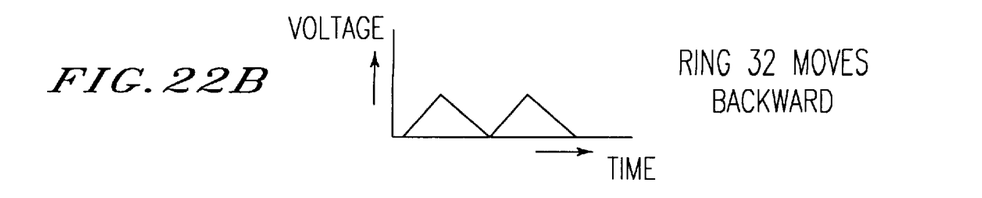

More specifically, a basic method of moving the focus cam ring forward and backward in JP No. 8-94906/1996 is now explained referring to FIGS. 21 and 22. To make the explanation simple and clear, an exemplary structure of a driving device is illustrated simply in FIG. 21. The driving device includes a piezoelectric actuator 30 with one end face fixed to a flange 33, a rod 31 secured to another end face of the piezoelectric actuator 30, the rod 31 being supported for moving in the direction of an optical axis of a lens group, and a ring 32 engaged with the rod 31 (FIG. 21(A)). When a voltage with a slow rising-time pulse is applied to the piezoelectric actuator 30, the piezoelectric actuator 30 expands slowly, and then the rod 31 and the ring 32 move forward (FIG. 21(B)). When a voltage with a steep falling-time pulse is applied to the piezoelectric actuator 30, the piezoelectric actuator 30 contracts rapidly, and then the rod 31 moves backward. However, in this contracting operation the ring 32 is not contracted from its expanded position because the inertia force of the ring 32 exceeds the friction force produced between the ring 32 and the rod 31 (FIG. 21(C)). Thus, when the aforementioned driving pulses having the slow rising-time and the steep falling-time are repeatedly applied to the piezoelectric actuator 30 (FIG. 22(A)), the ring 32 moves forward successively with each driving pulse. On the other hand, when driving pulses having a steep rising-time and a slow falling-time are repeatedly applied to the piezoelectric actuator 30 (FIG. 22(B)), the ring 32 moves backward.

Thus, in this background art by moving the focus cam ring 32 directly in the optical axis direction by the deformation of the piezoelectric member 30, the construction of the driving device of the lens device can be simpler than in a driving device using a motor. As a result, a number of parts, a size, and a weight of the driving device can be reduced.

However, the above-described lens device has difficulties in providing an accurate focusing because constant friction between the driving section and the focus cam ring 32 is always required to move the focus cam ring 32 engaged with the lens group forward or backward continuously while changing the rising-time and falling-time of the driving pulses of the voltage applied to the piezoelectric actuator 30. For example, a quality of component parts, an inclination of the camera, and environmental conditions, such as a temperature, influence this friction. Also, the lens device needs to drive with multiple-pulses to move the piezoelectric actuator 30 to a predetermined distance, and this still requires significant time.

SUMMARY OF THE INVENTION

Accordingly, an object of the present invention is to provide a novel focus adjusting device for a camera that is capable of accurately focusing an imaging unit, such as a lens group, a film, a charge coupled device, a CMOS sensor, etc., and which has a simple construction, is low-cost, and is space saving.

In order to achieve this and other objects, in one feature the present invention is directed to a focus adjusting device which includes an imaging unit, such as a lens group, a film, a charge coupled device, a CMOS sensor, etc., and at least one electrostriction unit deforming based on an applied voltage and configured to move the imaging unit from the deforming. Further, positioned between the imaging unit and the at least one electrostriction unit is a mechanism for increasing or accumulating the deforming of the at least one electrostriction unit. The electrostriction unit can take the form of a laminate piezoelectric device.

In one specific embodiment of the present invention, the mechanism provided between the imaging unit and the at least one electrostriction unit is a lever which increases the deforming of the at least one electrostriction unit.

In another embodiment of the present invention, at least two electrostriction units are utilized and the mechanism provided between the at least two electrostriction units and the imaging unit is a coupling between the at least two electrostriction units which accumulates the deforming of each of the at least two electrostriction units.

According to a further embodiment of the present invention, the mechanism provided between the imaging unit and the at least one electrostriction unit is an elastic member with curved portions which increase the deforming of the at least one electrostriction unit in a direction perpendicular to a direction of the deforming of the at least one electrostriction unit.

As further features in the present invention, a memory can be provided to store data of a voltage to be applied to the at least one electrostriction unit for a desired deformation in a non-linear manner. Further, the voltage applied to the at least one electrostriction unit may be in the form of a single pulse.

BRIEF DESCRIPTION OF THE DRAWINGS

A more complete appreciation of the present invention and many of the attendant advantages thereof will be readily obtained as the same becomes better understood by reference to the following detailed description when considered in connection with the accompanying drawings, wherein.

DESCRIPTION OF THE PREFERRED EMBODIMENTS

Figure 1:
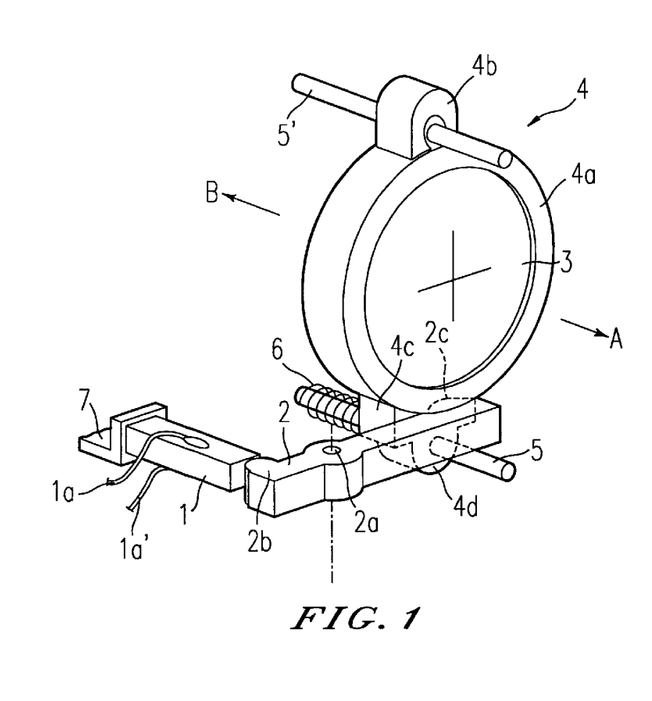
FIG. 1 is a schematic perspective view of a focus adjusting device according to a first embodiment of the present invention.

Referring now to the drawings, wherein like reference numerals designate identical or corresponding parts throughout the several views, and more particularly referring to FIG. 1 thereof, a schematic perspective view of a focus adjusting device according to a first embodiment of the present invention is illustrated.

A focus adjusting device illustrated in FIG. 1 includes an electrostriction device 1 such as a laminate piezoelectric device (hereinafter the term laminate piezoelectric device is used as an example of electrostriction device 1), disposed so that a deformation under a voltage application is generated in parallel to an optical axis of a photographic optical system. The focus adjusting device also includes a lever 2 which abuts against an end face of the laminate piezoelectric device 1 and which amplifies the deformation of the laminate piezoelectric device 1 to move an imaging device, e.g. a lens 3 constituting a part of a lens group (not shown). A lens frame 4 holds the lens 3. A main pole 5 and a sub-pole 5' guide the lens frame 4, a biasing spring 6 biases the lens frame 4, and a stopper 7 is fixed to a camera body (not shown).

The above-described laminate piezoelectric device 1 is, e.g., in a rectangular solid shape and has one end face in abutment against a convex portion 2b of the lever 2 and the other end face fixed to the stopper 7. Further, leads la and la' are provided on the laminate piezoelectric device 1 to apply a voltage thereto, and voltages of positive and negative polarity can be applied by the leads la and la'. In this embodiment, when a voltage with a positive polarity is applied to the laminate piezoelectric device 1, an expanding deformation is generated therein in the optical axis direction and is utilized for focus adjusting. Another variation of applying a voltage with a negative polarity to the laminate piezoelectric device to achieve the expansion is also clearly possible.

The above-described lever 2 is in a rectangular solid shape and has a rotational fulcrum 2a engaged with a support axis (not shown). Relative to the rotational fulcrum 2a, the lever 2 includes the convex portion 2b in abutment against the laminate piezoelectric device 1 and a convex portion 2c in abutment against a cylinder 4a of the lens frame 4.

The lens frame 4 includes: the cylinder 4a holding the lens 3; a convex portion 4b with an inserting hole through which the sub pole 5', which is provided at the upper part of the cylinder 4a and which is fixed on the camera body, passes, a projection 4c which is in a rectangular solid shape and is provided at the lower part of the cylinder 4a; and a convex portion 4d having an inserting hole through which the main pole 5, which is provided at the bottom end of the projection 4c and which is fixed on the camera body, passes. The main pole 5 and the sub pole 5' guide the lens frame 4 to move in the direction indicated by arrows A and B shown in FIG. 1.

Further, the biasing spring 6 is wound around the main pole 5, and one end of the biasing spring 6 is fixed to the camera body and the other end biases one face of the projection 4c of the lens frame 4 in the direction indicated by arrow A. Thereby, the lens frame 4, the lever 2, and the laminate piezoelectric device 1 are kept balanced and stable.

In the above-described construction, when a voltage corresponding to a required lens moving distance for focusing is applied to the laminate piezoelectric device 1 by a driving circuit (not shown), a deformation is generated in the laminate piezoelectric device 1 in the direction to push the convex portion 2b of the lever 2, i.e. to push the convex portion 2b in the direction indicated by arrow A. Then, the lever 2 slightly rotates on the axis of the rotational fulcrum 2a in the counterclockwise direction, and thereby the deformation of the laminate piezoelectric device 1 is increased according to the ratio between (1) the length from the rotational fulcrum 2a to the convex portion 2b, and (2) the length from the rotational fulcrum 2a to the convex portion 2c. Then, the convex portion 2c of the lever 2 pushes the projection 4c of the lens frame 4, and the lens frame 4 is then guided by the main pole 5 and the sub pole 5' to move in the direction indicated by arrow B. This results in moving the lens 3 to the required distance and in an accurate focusing.

Figure 2:
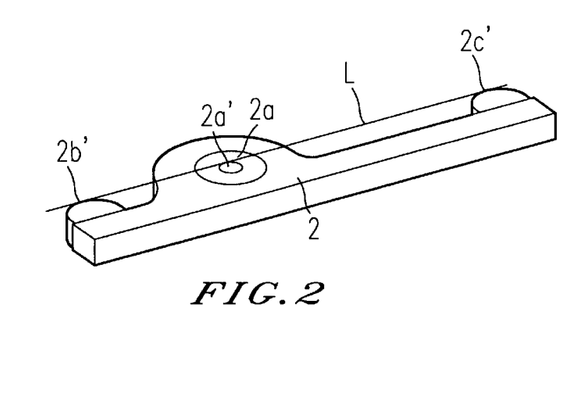
FIG. 2 is a perspective view of a lever 2 in FIG. 1.
Figures 3, 4:
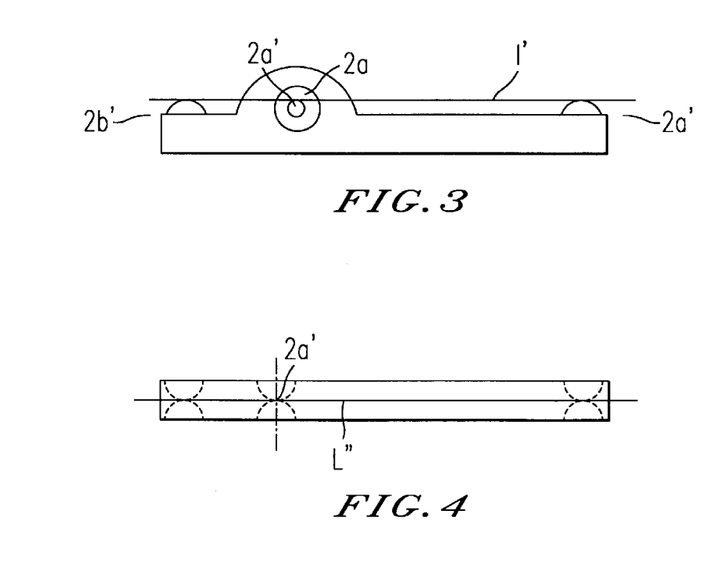
FIG. 3 is a top view of the lever 2.
FIG. 4 is a front view of the lever 2.

Next, an exemplary construction of the above-described lever 2 is explained in FIG. 2 through FIG. 7. FIG. 2 is a perspective view of the lever 2. FIG. 3 is a top view of the lever 2. FIG. 4 is a front view of the lever 2.

As illustrated in FIG. 2 through FIG. 5, each top and bottom face of the convex portions 2b and 2c of the lever 2 is tapered to a knife-edge shaped tip. A tip of the convex portion 2b is shown in the Figures as point 2b', a tip of the convex portion 2c is shown as point 2c', and a tip point of a hole of rotational fulcrum 2a is shown as point 2a'. Further, each tip 2b', 2c' of the convex portions 2b and 2c and tip 2a' of the hole for the rotational fulcrum 2a lie in a straight line L, as illustrated in FIG. 2. Viewed from a different angle, each tip 2b', 2c' of the convex portions 2b and 2c and tip 2a' of the hole of the rotational fulcrum 2a lie in a straight line L' in a vertical direction as illustrated in FIG. 3 and in a straight line L" in a horizontal direction as illustrated in FIG. 4. With the above-described construction of the lever 2, a supporting point, a force point, and an action point are aligned on the same straight line, which thereby provides an accurate leverage ratio for increasing deformation.

Figure 5:
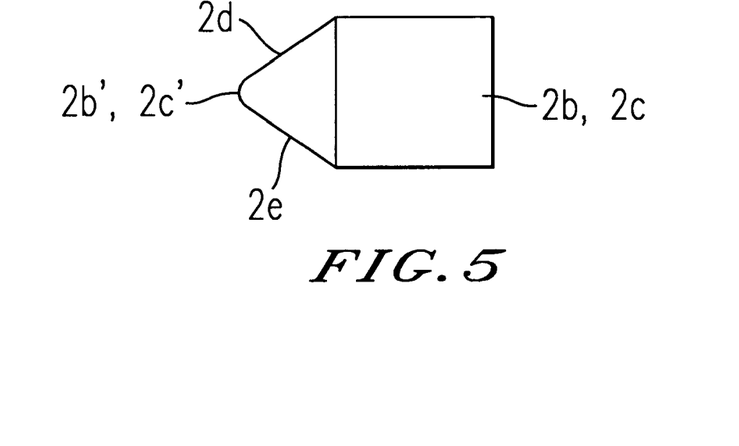
FIG. 5 is a side view of tapered portions of convex portions of the lever 2.

FIG. 5 is a side view of tapered portions (2d and 2e) of the top and bottom faces of the convex portions 2b, 2c of the lever 2.

Figure 6:
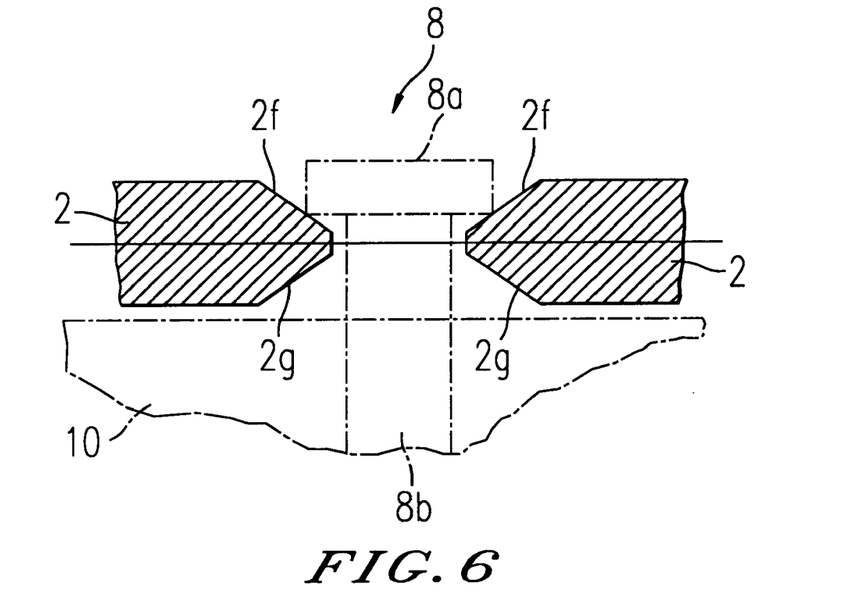
FIG. 6 is a sectional view of a hole for a rotational fulcrum of the lever 2.
Figure 7:
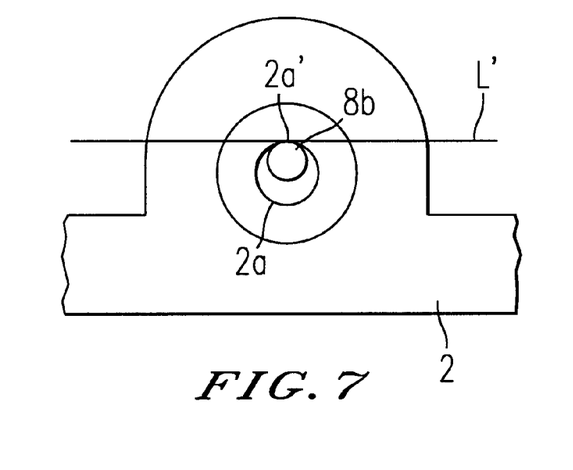
FIG. 7 is an enlarged view of the hole for the rotational fulcrum of the lever 2.

FIG. 6 is a sectional view of the hole of the rotational fulcrum 2a of the lever 2, and FIG. 7 is an enlarged view (top view) of the hole of the rotational fulcrum 2a of the lever 2. In FIG. 6, the reference characters 2f and 2g indicate tapered portions of the top and bottom faces of the lever 2 which form the hole for the rotational fulcrum 2a, and a support shaft 8 is indicated by a dot-and-dash line. The support shaft 8 is constructed of a head portion 8a, for avoiding floating of the lever 2, and a shaft 8b implanted in a camera body 10. The lever 2 rotates about the support shaft 8.

Figure 8:
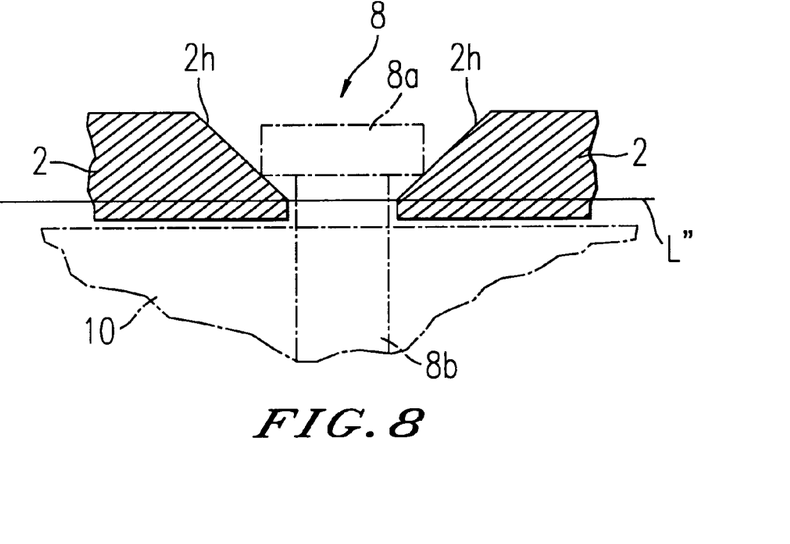
FIG. 8 is a first modification of the hole for the rotational fulcrum of the lever 2.

FIG. 8 illustrates a first example of a modification of the hole for the rotational fulcrum 2a of the lever 2. In FIG. 8 identical elements to those in FIG. 6 are marked with the same reference numerals and explanations thereof are omitted. The hole for the rotational fulcrum in FIG. 8 is formed only by the tapered portions 2h, and accordingly the head portion 8a of the support shaft 8 is prevented from protruding from the top face of the lever 2. In this construction, a space for the head portion 8a of the support shaft 8 can be saved, and one side taper permits making a mold simply.

Figure 9:
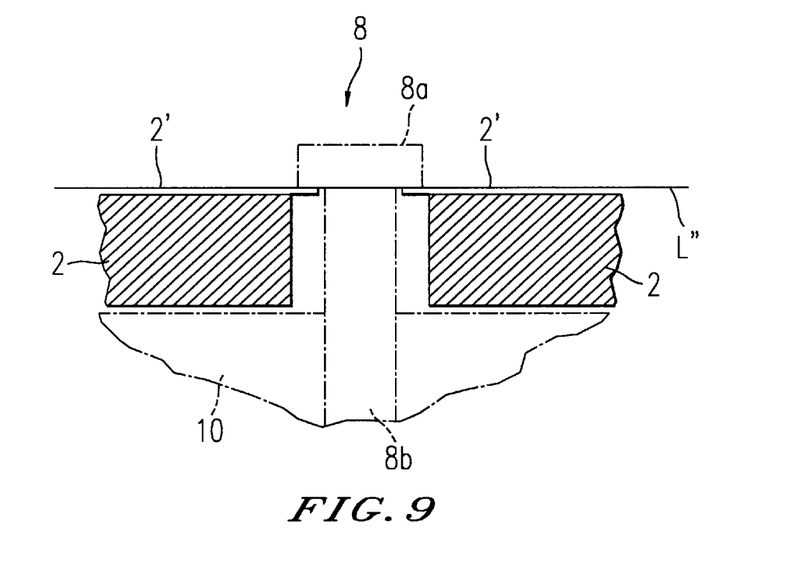
FIG. 9 is a second modification of the hole for the rotational fulcrum of the lever 2.

FIG. 9 illustrates a second example of a modification of the hole for the rotational fulcrum 2a of the lever 2. In FIG. 9 identical elements to those in FIG. 6 are marked with the same reference numerals and explanations thereof are omitted. In FIG. 9, a thin member 2' is secured on the top face of the lever 2 and slightly covers the hole for the rotational fulcrum 2a to support the head portion 8a of the support shaft 8. In this construction, using the thin member 2' can avoid floating of the lever 2 more effectively than in the constructions in FIG. 6 and FIG. 8. Further, as tapered portions for the hole for the rotational fulcrum 2a are not required in this construction, a mold can be made more simply than in the modification of FIG. 8.

In both of the modifications of FIGS. 8 and 9, the tip portion of convex portions 2b, 2c at both ends of the lever 2 and the hole for the rotational fulcrum 2a can also be positioned in the straight line L".

Figure 10:
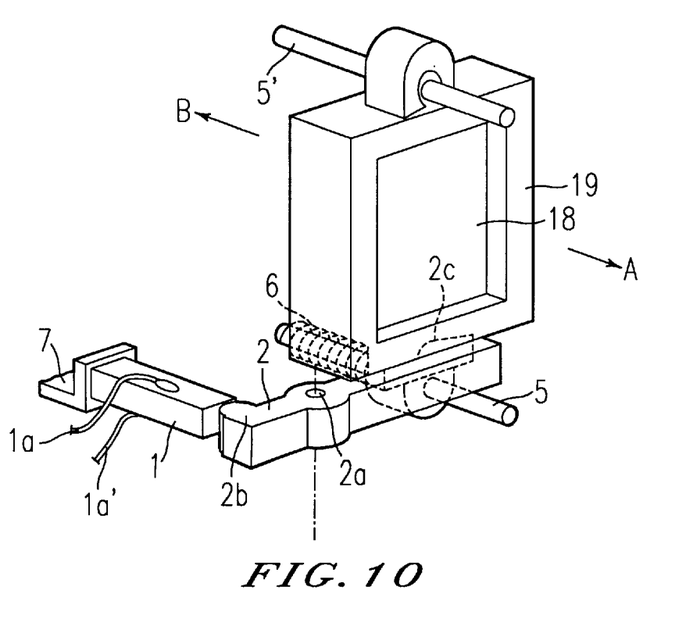
FIG. 10 is a schematic perspective view of a focus adjusting device according to a second embodiment of the present invention.

A second embodiment of the present invention as illustrated in FIG. 10 is now explained. FIG. 10 is a schematic perspective view of a construction of a focus adjusting device of the present invention. In FIG. 10, identical elements to those in FIG. 1 are marked with the same reference numerals and explanations for other than characteristic elements are omitted.

In the focus adjusting device according to the second embodiment, the focus adjusting is performed by moving an imaging device. In FIG. 10, the reference numeral 18 indicates an imaging device, such as a charge coupled device (CCD) or CMOS sensor, and the reference numeral 19 indicates a holder for holding the imaging device 18. One face of a projection (not shown) provided at a lower part of the holder 19 abuts against the convex portion 2c of the lever 2, and the other face is biased by the spring 6. As a result, the holder 19, the laminate piezoelectric device 1, and the lever 2 are kept balanced and stable.

In the above-described construction of FIG. 10, when a voltage corresponding to a required imaging device distance for focusing is applied to the laminate piezoelectric device 1 by a driving circuit (not shown), a deformation is generated in the laminate piezoelectric device 1 in the direction to push the convex portion 2b of the lever 2, i.e. to push convex portion 2b in the direction indicated by arrow A. Then, the lever 2 slightly rotates on the axis of the rotational fulcrum 2a in the counter-clockwise direction, and then the deformation of the laminate piezoelectric device 1 is increased according to the lever ratio between (1) the length from the rotational fulcrum 2a to the convex portion 2b, and (2) the length from the rotational fulcrum 2a to the convex portion 2c. Then, the convex portion 2c of the lever 2 pushes the projection of the holder 19, and the holder 19 is guided by the main pole 5 and the sub pole 5' to move in the direction indicated by arrow B. This results in moving the imaging device 18 to the required distance and in an accurate focusing.

The present invention as set forth in the first and second embodiments provides the following benefits. First, as these embodiments of the present invention do not utilize a motor for moving the imaging unit, such as the lens group, charge coupled device, or CMOS sensor, a space required by a motor and accompanying gear mechanism is not needed, and thereby a space saving can be achieved. Further, compared to background art which also utilizes a piezoelectric driver such as discussed with respect to FIGS. 21 and 22, the present invention does not require the supplying of multiple pulses, but instead can operate by only supplying a single pulse to the laminate piezoelectric device 1. As a result, a time required to move an imaging unit in the present invention can be reduced. Further, the operation of the present invention does not require a frictional contact between elements such as in the background art of FIGS. 21 and 22, and thereby the present invention is not affected by conditions which may affect such a frictional contact, such as quality of component parts, inclining of the camera, and environmental conditions, such as temperature changes.

As a result, in the present invention as shown in FIGS. 1–10 an accurate focusing can be performed in a simple, low-cost, and space saving construction of a focus adjusting device. Further, as the supporting point (the one end point 2a' of the hole for the rotational fulcrum 2a), the force point (the tip 2b' of the convex portion 2b), and the action point (the tip 2c' of the convex portion 2c) are aligned on the same straight line, the deformation of the laminate piezoelectric device 1 can be increased accurately and efficiently.

Furthermore, in the second embodiment of FIG. 10, as the imaging device used in a digital camera is light in weight compared to a weight of a lens system, the imaging device can be more efficiently moved by the deformation of the laminate piezoelectric device 1 for focusing. This means that a voltage for generating deformation of the laminate piezoelectric device 1 can be reduced to move the imaging device for focusing, and accordingly a battery life can be increased. As a result, this invention also serves to save energy and is further environmentally friendly.

Figure 11:
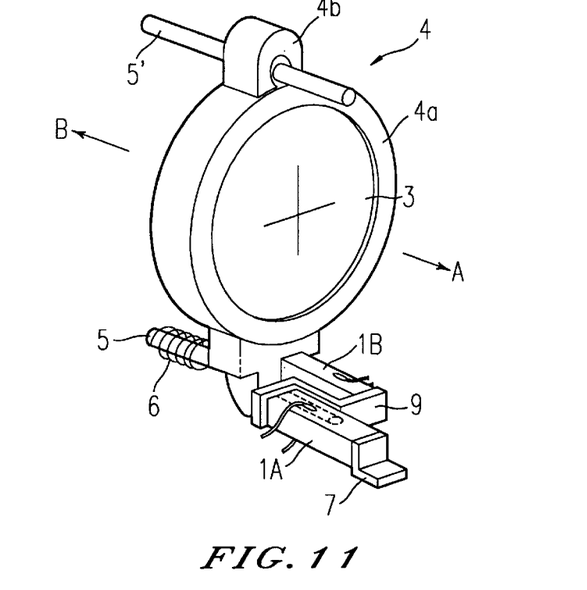
FIG. 11 is a schematic perspective view of a focus adjusting device according to a third embodiment of the present invention.
Figure 12:
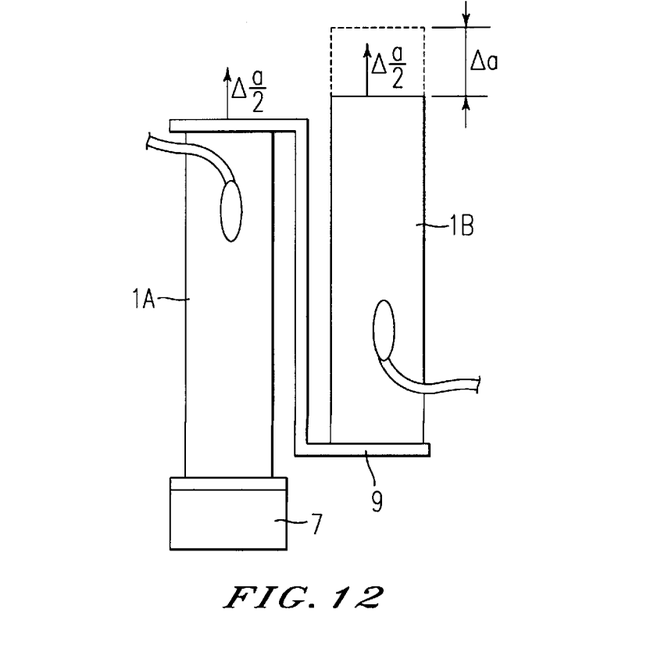
FIG. 12 is a top view of electrostriction devices in FIG. 11.

A third embodiment of the present invention as illustrated in FIG. 11 is now explained. FIG. 11 is a schematic perspective view of a construction of a focus adjusting device, and FIG. 12 is a top view of laminate piezoelectric devices 1A, 1B of the focus adjusting device in FIG. 11. In FIG. 11, the identical elements to FIG. 1 are marked with the same reference numerals and explanations for other than characteristic elements are omitted.

Referring to FIG. 11, reference characters 1A and 1B indicate laminate piezoelectric devices disposed so that a deformation under a voltage application is generated in parallel to an optical axis of a photographic lens system, and reference numeral 9 indicates a holding member disposed between the laminate piezoelectric device 1A and 1B to couple deformations in the laminate piezoelectric devices 1A and 1B. The holding member 9 serves to move the lens frame 4 by accumulating each deformation of each of the laminate piezoelectric devices 1A and 1B.

Specifically, the focus adjusting device in FIG. 11 includes two laminate piezoelectric devices 1A and 1B in parallel to each other. One end face of the laminate piezoelectric device 1A is secured against stopper 7, which is fixed to the camera body, by adhesive or the like. The other end face of the laminate piezoelectric device 1A is secured to the holding member 9, also by adhesive or the like. On the other hand, one end face of the laminate piezoelectric device 1B is secured to the holding member 9, by adhesive or the like, and the other end face of piezoelectric device 1B abuts against a projection of the lens frame 4. The projection of the lens frame 4 is biased by the spring 6 in the direction indicated by arrow A. Thereby, the lens frame 4, the laminate piezoelectric devices 1A/1B, and the holding member 9 are kept balanced and stable.

In the above-described construction, when a voltage corresponding to a required lens moving distance for focusing is applied to the laminate piezoelectric devices 1A and 1B by a driving circuit (not shown), each deformation generated in the laminate piezoelectric device 1A and 1B is accumulated by the holding member 9, i.e., both deformations move holding member 9 in the direction indicated by arrow B. Then, the lens frame 4 moves in the direction indicated by arrow B in accordance with the accumulated deformation (which corresponds to the required lens moving distance for focusing), and thereby an accurate focusing can be performed. Referring to FIG. 12, for example, if the laminate piezoelectric devices 1A and 1B are each displaced by a distance $\Delta a/2$ respectively, a total deformation amounts to $\Delta a$, and then the lens frame 4 moves the distance of $\Delta a$ in the direction indicated by arrow B accordingly.

Figure 13:
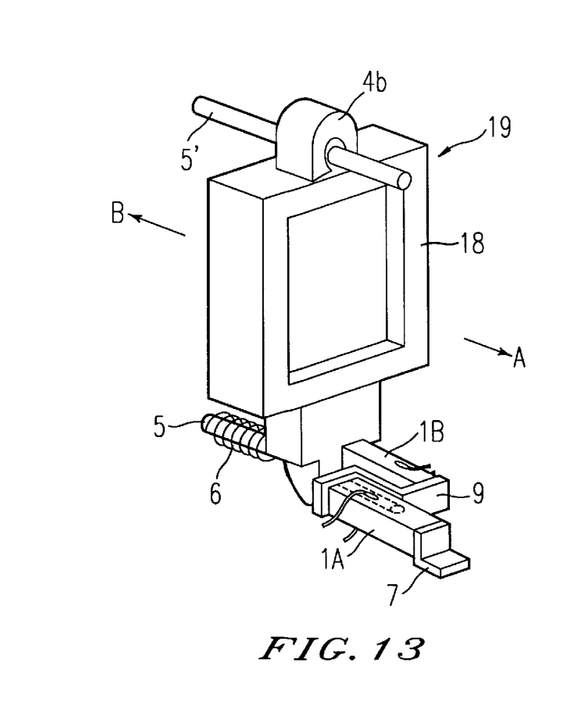
FIG. 13 is a schematic perspective view of a focus adjusting device according to a fourth embodiment of the present invention.

A fourth embodiment of the present invention as illustrated in FIG. 13 is now explained. FIG. 13 is a schematic perspective view of a construction of a focus adjusting device according to the fourth embodiment. In FIG. 13, the identical elements to FIG. 11 are marked with the same reference numerals and explanations for other than characteristic elements are omitted.

In the focus adjusting device according to the fourth embodiment of FIG. 13, the focus adjusting is performed by moving an imaging device. In FIG. 13, reference numeral 18 indicates an imaging device such as a CCD or CMOS sensor and reference numeral 19 indicates a holder for holding the imaging device 18. One face of a projection (not shown) provided at a lower part of the holder 19 abuts against one face of the laminate piezoelectric device 1B and the other face of the projection of holder 19 is biased by the spring 6. Thereby, the holder 19, the laminate piezoelectric devices 1A/1B, and the holding member 9 are kept balanced and stable.

In the above-described construction, when a voltage corresponding to a required imaging device moving distance for focusing is applied to the laminate piezoelectric devices 1A and 1B by a driving circuit (not shown), each deformation generated in the laminate piezoelectric devices 1A and 1B is accumulated by the holding member 9. Then, the holder 19 moves in the direction indicated by arrow B in accordance with the accumulated deformation (which corresponds to the required imaging device moving distance for focusing), and thereby an accurate focusing can be performed.

With the constructions described above according to the third and fourth embodiments, accumulating the deformations of two or more laminate piezoelectric devices 1A, 1B may provide a more precise required deformation than by using only one laminate piezoelectric device. Specifically, when comparing the use of only one laminate piezoelectric device and two or more laminate piezoelectric devices for generating the same deformation, a higher voltage is required to be applied to the one laminate piezoelectric device compared to each of two or more laminate piezoelectric devices. As a result, if a higher voltage is applied to only one laminate piezoelectric device repeatedly, a durability thereof may be effected. Further, in a system utilizing two or more laminate piezoelectric devices, the total deformation amount of the laminate piezoelectric devices can be controlled in a stepwise way, first by selecting some of the laminate piezoelectric devices to which a voltage is applied for generating deformation, and then by changing a number of the laminate piezoelectric devices to be deformed, under a condition such that the applied voltage to each laminate piezoelectric devices is kept at a certain value.

The above-described system shows utilizing two laminate piezoelectric devices 1A, 1B. The number of laminate piezoelectric devices cascaded together to accumulate deformations can, of course, exceed two based on the same principles as disclosed above.

Figure 14:
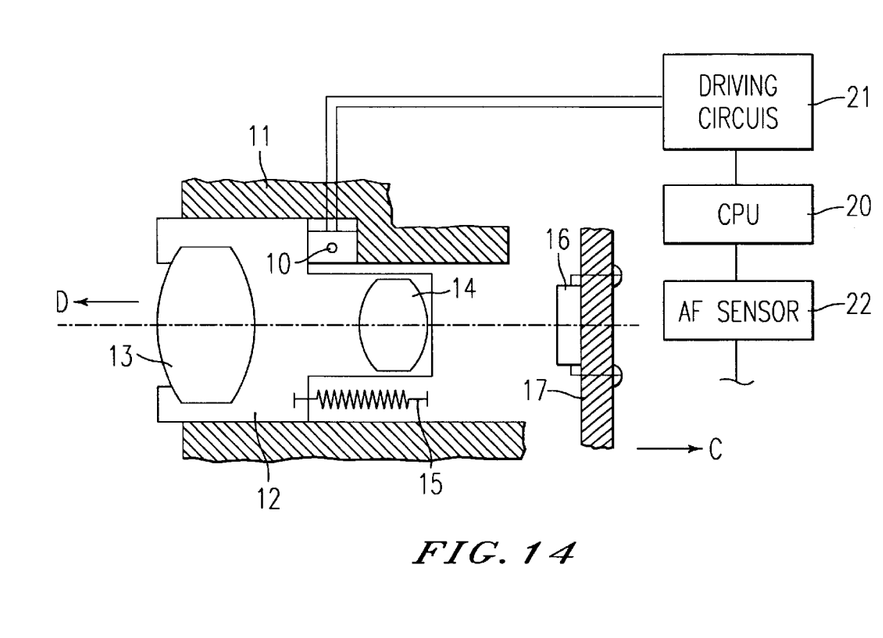
FIG. 14 is a schematic perspective view of a focus adjusting device according to a fifth embodiment of the present invention.
Figure 15:
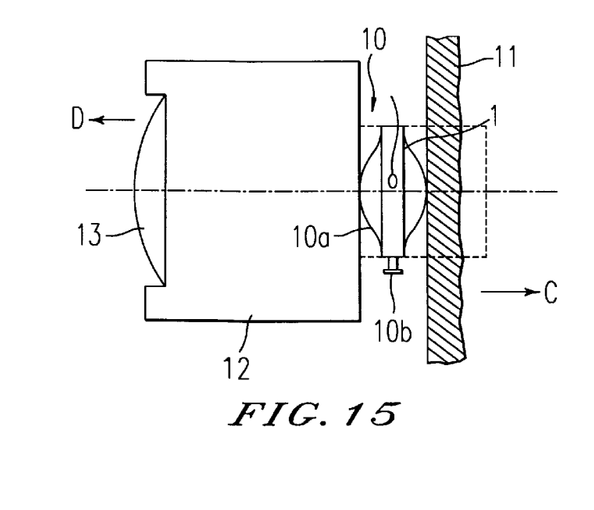
FIG. 15 is a top schematic top view of a focus adjusting device according to the fifth embodiment of FIG. 14.
Figure 16:
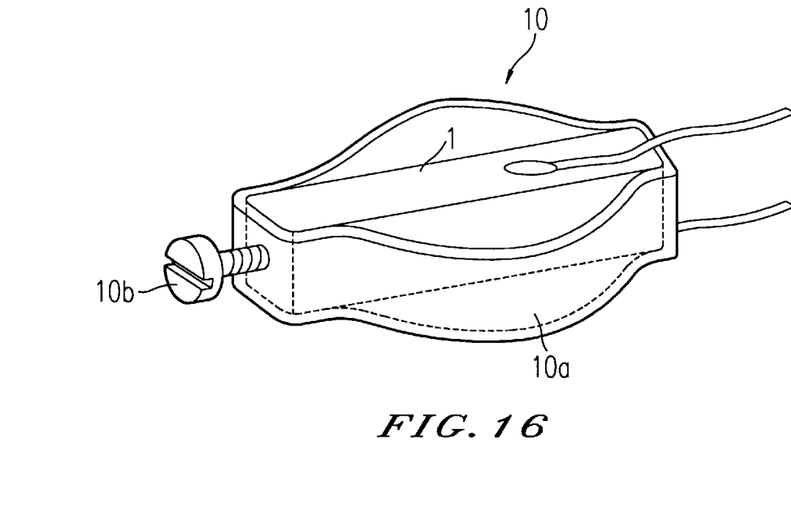
FIG. 16 is an enlarged perspective view of an increase device of the fifth embodiment of FIG. 14.
Figure 17:
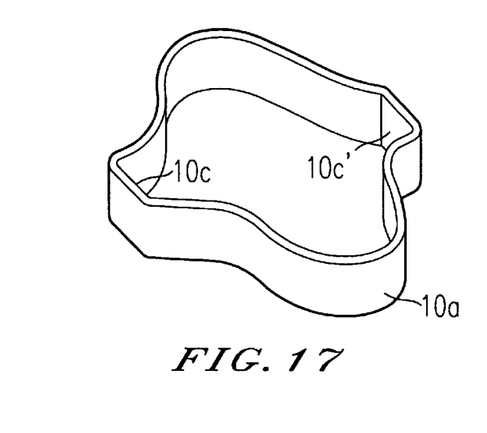
FIG. 17 is an enlarged perspective view of an elastic member in FIG. 16.

A fifth embodiment of the present invention as illustrated in FIG. 14 is now explained. FIG. 14 is a schematic perspective view of a focus adjusting device. FIG. 15 is a schematic top view of the focus adjusting device in FIG. 14. FIG. 16 is an enlarged perspective view of an increase device in FIG. 14. FIG. 17 is an enlarged perspective view of an elastic member in FIG. 16.

Referring to FIGS. 14 and 15, the focus adjusting device of the fifth embodiment includes a deformation increase mechanism 10 (hereinafter referred to as an increase device), which in turn includes a laminate piezoelectric device 1, which is disposed so that the deformation of the laminate piezoelectric device 1 is perpendicular to an optical axis of a lens and is constructed to increase the deformation of the laminate piezoelectric device 1 while changing the direction of the deformation to the direction of the optical axis of a lens group. The focus adjusting device includes the lens frame 12 which holds a front lens group 13 and a rear lens group 14, a spring 15 with one end fixed to a camera body (not shown) and with another end fixed to the lens frame 12 to bias the lens frame 12 in the direction indicated by arrow C, a substrate 17, an imaging device 16 secured, e.g., soldered, on the substrate 17, and a central processing unit (CPU) 20 which controls a driving circuit 21 according to a detection output from an AF sensor 22. The driving circuit 21, which is controlled by the CPU 20, applies a voltage depending on a required lens moving distance for focusing to laminate piezoelectric device 1 of increase device 10, and the AF sensor 22 detects a focusing condition of a lens and outputs a result of the focusing condition to the CPU 20. Reference numeral 11 indicates a part of the camera body.

The increase device 10 is provided between the part of camera body 11 and the lens frame 12, and has one face secured to the part of camera body 11. When a voltage corresponding to a required lens moving distance for focusing is applied to the increase device 10 by the driving circuit 21, the deformation increased by the increase device 10 causes the lens frame 12 to move in the direction indicated by arrow C for focusing. More particularly, when the laminate piezoelectric device 1 is expanded, the width of elastic member 10a decreases, i.e., the curved portions of elastic member 10a straighten out, and thereby the lens frame is moved in the direction indicated by arrow C.

Next, a detailed construction for the above-described increase device 10 is explained. As illustrated in FIG. 16, the increase device 10 includes laminate piezoelectric device 1, an elastic member 10a which encloses the laminate piezoelectric device 1 and which compresses both end faces of the laminate piezoelectric device 1, and an adjustment screw 10b for providing an adjustment to vary a curvature of the elastic member 10a.

The above-described elastic member 10a is constructed to always energize the inserted laminate piezoelectric device 1 toward its center, i.e., compress the laminate piezoelectric device 1, and dispose each curving portion of elastic member 10a in symmetric relation. When a predetermined voltage polarity is applied to the laminate piezoelectric device 1, a contracting deformation may be generated therein, and the elastic member 10a increases the deformation of the elastic member 10 in a direction perpendicular to the laminate piezoelectric device 1 by changing the shape of the elastic member 10a. Also, a predetermined voltage polarity can be applied to the laminate piezoelectric device 1 to expand the laminate piezoelectric device, and then the elastic member 1 decreases its deformation. This latter operation is executed in the embodiment of FIG. 14 as described above, although the former operation could also be executed.

FIG. 17 illustrates the above-mentioned elastic member 10a in a natural state. The distance between the opposed faces 10c and 10c' which hold the laminate piezoelectric device 1 is set to be shorter than the length of the laminate piezoelectric device 1 in the natural state, so that an energizing force, i.e., a compression force, toward the center is generated upon inserting the laminate piezoelectric device 1 into the elastic member 10a.

In this fifth embodiment, the increase device 10 is disposed so that the lens moves backward for focusing, i.e., in the direction indicated by arrow C. However, depending on a method of moving lens for focusing, the increase device 10 may be disposed at the position to move a lens forward for focusing, for example.

Figure 18:
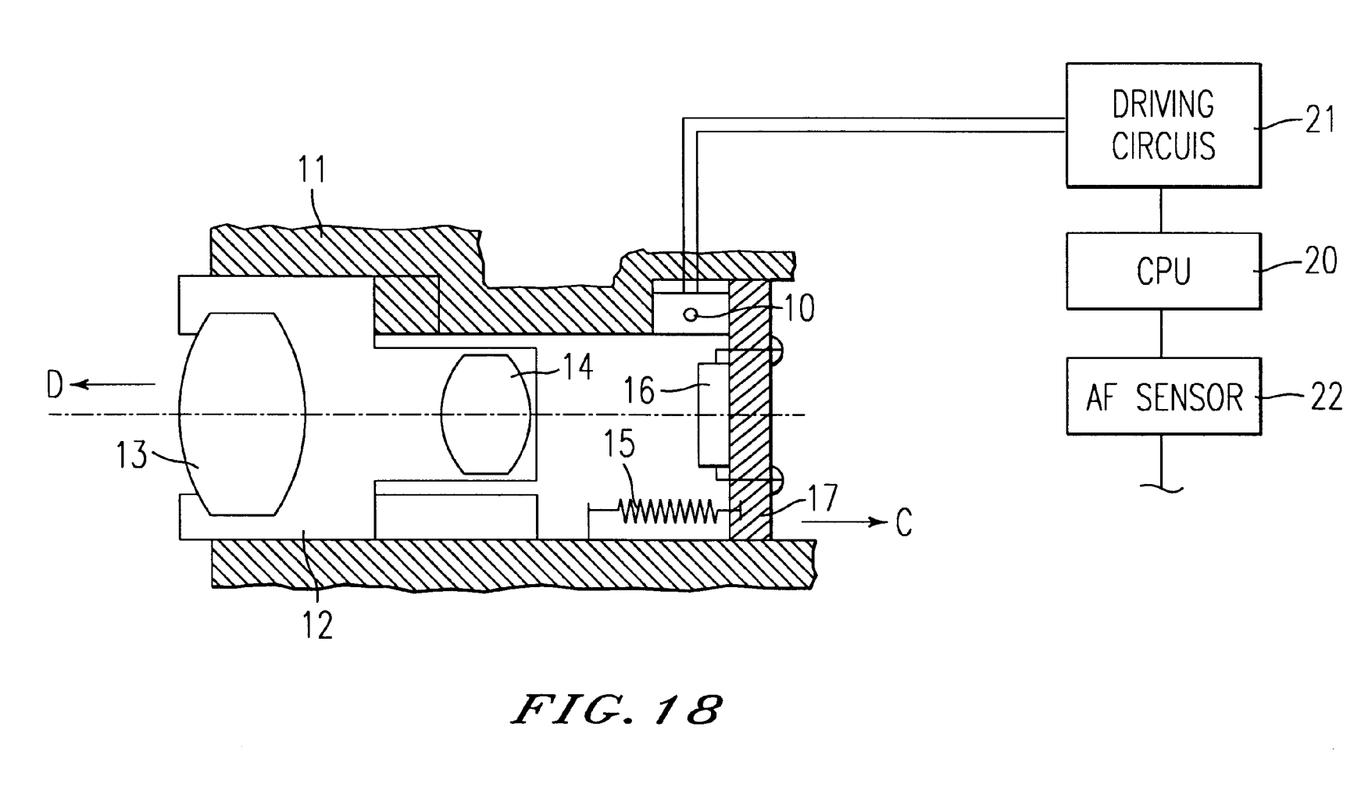
FIG. 18 is a schematic perspective view of a focus adjusting device according to a sixth embodiment of the present invention.

A sixth embodiment of the present invention as illustrated in FIG. 18 is now explained. FIG. 18 is a schematic perspective view of the focus adjusting device of the sixth embodiment. In FIG. 18, the identical elements to FIG. 14 are marked with the same reference numerals and explanations for other than characteristic elements are omitted.

In the focus adjusting device according to the sixth embodiment of FIG. 18, the focus adjusting is performed by moving the imaging device 16. As illustrated in FIG. 18, the increase device 10 is provided between the part of camera body 11 and the substrate 17, and has one face secured to the part of camera body 11. When a voltage corresponding to a required imaging device moving distance for focusing is applied to the increase device 10 by the driving circuit 21, the deformation increased by the increase device 10 causes the substrate 17 to move the imaging device 16 in the left direction indicated by arrow D for focusing. That is, in this embodiment the laminate piezoelectric device is structured to expand when the noted voltage is applied thereto. The spring 15, with one end fixed to the camera body and the other end fixed to the substrate 17, biases the substrate 17 in the left direction indicated by arrow D. In this sixth embodiment of FIG. 18, the increase device 10 is disposed so that the imaging device moves forward for focusing, i.e.. in the direction indicated by arrow D. However, depending on a method of moving the imaging device for focusing, the increase device 10 may be disposed at a position to move the imaging device backward for focusing, for example similarly as in the embodiment of FIG. 14. The constructions and functions of the increase device 10 in the sixth embodiment 6 are the same as in the fifth embodiment in FIGS. 16 and 17.

With the constructions described above, according to the fifth and sixth embodiments, with the use of the increase device 10 the laminate piezoelectric device 1 is disposed so that its short length direction is along the optical axis direction. As a result, a space for the whole lens group or the imaging device 16 can be reduced, and a compact design can be realized. Especially, for example, the above-described construction is useful in a thin-designed camera using a lens barrel.

Furthermore, according to the fifth embodiment, as the focus adjusting device is constructed to move the whole lens group, it is suitable for use in a focus correction for a single focal distance lens and in a focus adjusting in an optical system having a zoom and a macro mode.

Figure 19A:
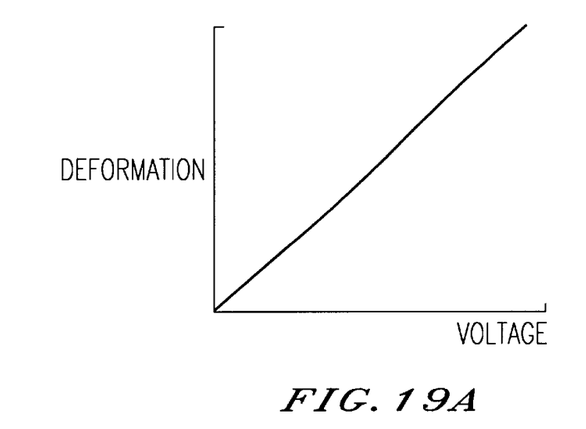
FIGS. 19(A)–19(C) are graphs showing a relation between a deformation and a voltage, and between a lens moving distance and a distance from an object to an image focusing point.
Figures 19B, 19C:
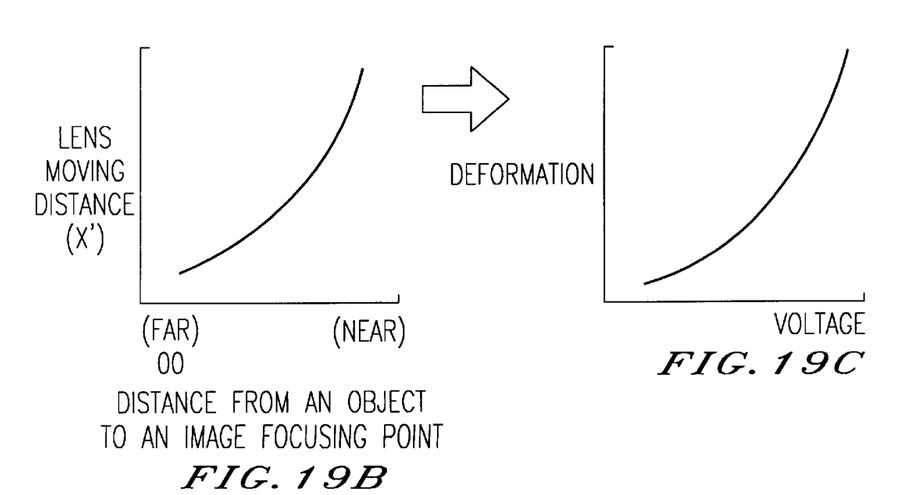

Next, a characteristic relation between a "deformation" in the laminate piezoelectric device 1 and a "voltage" applied to the laminate piezoelectric device 1 in the first to sixth embodiments is now explained with reference to FIG. 19. FIG. 19(A) is a graph showing a general relation between a deformation and a voltage in using a laminate piezoelectric device. FIG. 19(B) is a graph showing a relation between a required lens moving distance for focusing and a distance from an object to an image. FIG. 19(C) is a graph showing a relation between a deformation and an applied voltage according to the present invention.

Figure 19D:
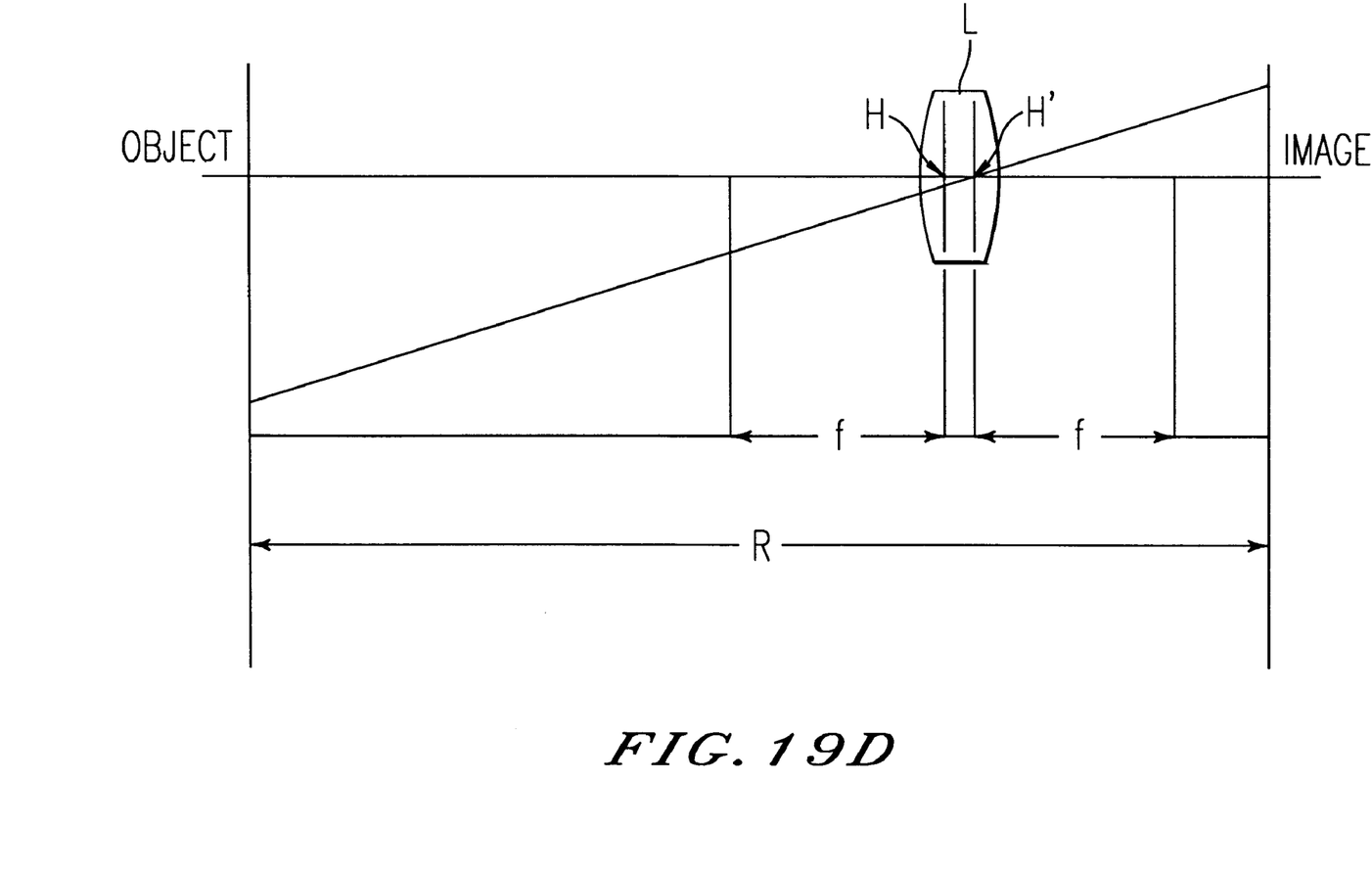
FIG. 19(D) is an optical diagram showing parameters used in determining a lens moving distance.

Referring to FIG. 19(A), when a voltage is applied to a laminate piezoelectric device in a background device for generating a deformation therein, for example, in an X-Y stage controlling, a relation between a deformation and a voltage is generally shown linearly. On the other hand, in the present invention, a voltage is applied to the laminate piezoelectric device 1 so that a relation between a deformation and a voltage is indicated by an ascending curve (i.e., a non-linear functional curve) as shown in FIG. 19(C). In an image focusing for moving a lens, and with reference to FIG. 19(D), assuming that "f" represents a focal distance of a lens L, "HH'" represents a distance between front and rear main principal points of the lens L, and "R" represents a distance from an object to an image, a lens moving distance x' is given by the following formula:

$$\text{lens moving distance } x' = \frac{R - 2f - \overline{HH'}}{2} - \sqrt{\left(\frac{R - 2f - \overline{HH'}}{2}\right)^2 - f^2}$$

Further, a relation between the "lens moving distance x'" and the "distance from an object to an image" R is indicated by an ascending curve (i.e., a non-linear functional curve) as shown in FIG. 19(B).

As the above-described "lens moving distance" corresponds to a "deformation" of the laminate piezoelectric device 1, a voltage for a desired deformation of a laminate piezoelectric device can be set in accordance with the ascending curve (i.e., a non-linear functional curve) as shown in FIG. 19(C). Further, in the present invention to properly set the moving distance of the image device, respective data of a voltage and a deformation can be stored in a random-access memory (RAM) of a camera, i.e., a RAM can store the relationship shown in FIGS. 19(B) and 19(C). Therefore, after a distance from an object to an image focusing point is measured by an auto focus sensor, a required lens moving distance for focusing is given, as shown in FIG. 19(B). Then, a required deformation of the laminate piezoelectric device 1 corresponding to the required lens moving distance corresponding to a voltage value required to be applied to the laminate piezoelectric device for focusing, as shown in FIG. 19(C), can be read out from the data stored in the RAM.

Figure 20:
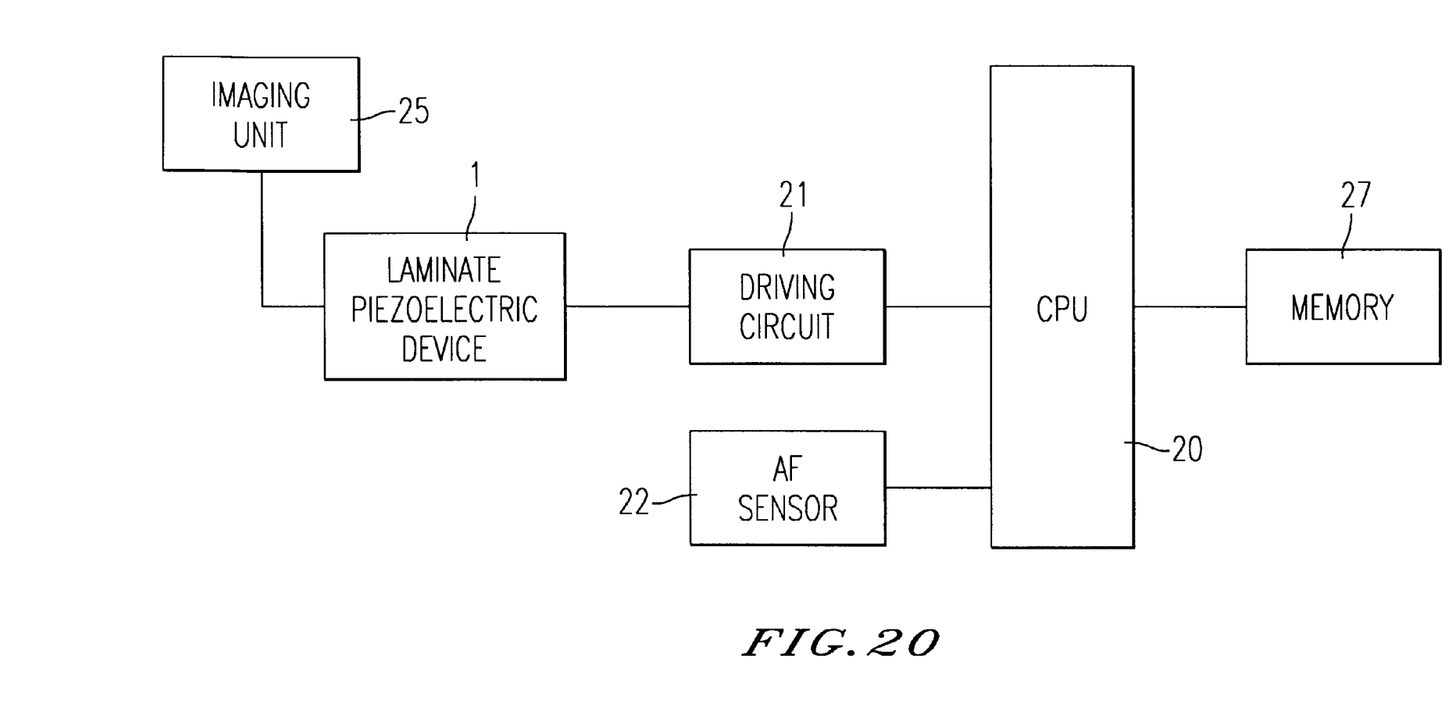
FIG. 20 shows a control structure which may be implemented in each embodiment of the present invention.

An implementation of the present invention to achieve this operation of accessing such data stored in a RAM is shown in FIG. 20.

As shown in FIG. 20, the present invention utilizes a CPU 20 connected to an auto focus sensor 22 and a driving circuit 21, similarly as shown in FIGS. 14 and 18. The driving circuit 21 provides a single driving pulse to the laminate piezoelectric form of any of the above-disclosed lens groups, charge coupled device, CMOS sensors, or a film, etc., to be moved. Also connected to the CPU is a memory 27, for example a RAM. As discussed above, this memory 27 at least stores data corresponding to the chart shown in FIG. 19(C) of a voltage needed to implement a required deformation in the laminate piezoelectric device 1. This data can be accessed as described above to provide a proper voltage, for a proper deformation, to the laminate piezoelectric device 1 for proper focus adjustment.

The above-described method of setting a voltage for generating a deformation for focusing can be applied to any kind of optical system.

Further, it is noted that in the present invention voltage of a single rectangular waveform pulse is applied to the laminate piezoelectric device 1, and this pulse will last for a period of time that the camera must be in an auto focus mode. e.g., until an operator takes a picture. Thus, in the present invention only a single pulse needs to be applied to the laminate piezoelectric device 1. On the other hand, a voltage of waveforms with multiple rising/falling pulses are required to be applied to the piezoelectric actuator in background art JP No. 8-94906, as shown in FIG. 22. By applying only a single pulse in the present invention a time required for a focusing operation can be reduced and fatigue induced into a piezoelectric actuator by multiple pulses can be reduced.

Obviously, numerous additional modifications and variations of the present invention are possible in light of the above teachings. It is therefore to be understood that within the scope of the appended claims, the present invention may be practiced otherwise than as specifically described herein.

This document is based on Japanese Patent Application No. 10-007038/1998 filed in the Japanese Patent Office on Jan. 16, 1998, the entire contents of which are hereby incorporated by reference.

What is claimed is:

1. A camera, comprising:

a focus adjusting device, including:
   an imaging unit;
   at least one electrostriction unit deforming based on an applied voltage and configured to move said imaging unit from the deforming, wherein said applied voltage corresponds to a required imaging unit moving distance for focusing; and
   means, positioned between the imaging unit and the at least one electrostriction unit, for increasing or accumulating the deforming of the at least one electrostriction unit.

2. A camera according to claim 1, wherein the means includes a lever positioned between the imaging unit and the at least one electrostriction unit to increase the deforming of the at least one electrostriction unit.

3. A camera according to claim 1, wherein the at least one electrostriction unit includes at least two electrostriction units connected in parallel, and the means includes a coupling between the at least two electrostriction units to accumulate the deformings of the at least two electrostriction units.

4. A camera according to claim 1, wherein the means includes an elastic member with curved portions configured to increase the deforming of the at least one electrostriction unit in a direction perpendicular to a direction of the deforming of the at least one electrostriction unit.

5. A camera according to claim 1, wherein the imaging unit includes an element selected from the group consisting of a charge coupled device and a CMOS sensor.

6. A camera according to claim 1, wherein the imaging unit includes a lens.

7. A camera according to claim 1, further comprising a memory storing data of a voltage to be applied to the at least one electrostriction unit for a desired deformation in a non-linear manner.

8. A camera according to claim 1, wherein the at least one electrostriction unit is a laminate piezoelectric element.

9. A camera according to claim 1, wherein the voltage applied to the at least one electrostriction unit is in the form of a single pulse.

10. A camera according to claim 7, wherein the deformation is based on a lens moving distance x' of a lens in the imaging unit, wherein the lens moving distance is defined as $$x' = \frac{R - 2f - \overline{HH'}}{2} - \sqrt{\left(\frac{R - 2f - \overline{HH'}}{2}\right)^2 - f^2}$$

where f represents a focal distance of the lens, HH' represents a distance between front and rear main principal points of the lens, and R represents a distance from an object to an image.

11. A camera, comprising:
a focus adjusting device, including:
an imaging unit;
at least one electrostriction unit deforming based on an applied voltage and configured to move the imaging unit from the deforming, wherein said applied voltage corresponds to a required imaging unit moving distance for focusing; and
a lever positioned between the imaging unit and the at least one electrostriction unit to increase the deforming of the at least one electrostriction unit.

12. A camera according to claim 11, wherein the lever includes first and second convex portions and a rotational fulcrum.

13. A camera according to claim 12, wherein tip points of the first and second convex portions and rotational fulcrum are aligned linearly.

14. A camera according to claim 11, wherein the electrostriction device is a laminate piezoelectric element.

15. A camera according to claim 11, wherein the imaging unit is selected from the group consisting of a lens, a charge coupled device, and a CMOS sensor.

16. A camera, comprising:
a focus adjusting device, including:
an imaging unit;
at least two electrostriction units positioned in parallel individually deforming based on an applied voltage and configured to move the imaging unit from the individual deforming, wherein said applied voltage corresponds to a required imaging unit moving distance for focusing; and
a coupling between the at least two electrostriction units to accumulate the individual deformings of the at least two electrostriction units.

17. A camera according to claim 16, wherein the at least two electrostriction units are laminate piezoelectric elements.

18. A camera according to claim 16, wherein the imaging unit is selected from the group consisting of a lens, a charge coupled device, and a CMOS sensor.

19. A camera, comprising:
a focus adjusting device, including:
an imaging unit;
at least one electrostriction unit deforming based on an applied voltage and configured to move the imaging unit from the deforming, wherein said applied voltage corresponds to a required imaging unit moving distance for focusing; and
an elastic member with curved portions encasing the at least one electrostriction unit to increase the deforming of the at least one electrostriction unit in a direction perpendicular to a direction of the deforming of the at least one electrostriction unit.

20. A camera according to claim 19, wherein the curved portions of the elastic member are symmetrical.

21. A camera according to claim 20, further comprising an adjusting screw configured to adjust the curved portions of the elastic member.

22. A camera according to claim 19, wherein the imaging unit is selected from the group consisting of a lens, a charge coupled device and a CMOS sensor.

23. A method for focus adjusting in a camera including an imaging unit, comprising the steps of:
deforming at least one electrostriction unit based on an applied voltage to move the imaging unit from the deforming, wherein said applied voltage corresponds to a required imaging unit moving distance for focusing; and
increasing or accumulating the deforming of the at least one electrostriction unit.

* * * * *